United States Patent [19]
Martorana et al.

[11] Patent Number: 5,270,550
[45] Date of Patent: Dec. 14, 1993

[54] COMPOSITE STRUCTURE HAVING PREDETERMINED TEMPERATURE/TIME PROFILES, AND METHOD OF MAKING SAME

[75] Inventors: Richard T. Martorana, Andover; Harland E. Alpaugh, Jr., Wilmington; Edward S. Hickey, Dover; David R. Fairbanks, Cambridge; Ingrid L. Gorman, Wilmington; Kristie A. DePrete, Bedford, all of Mass.

[73] Assignee: The Charles Stark Draper Laboratory, Cambridge, Mass.

[21] Appl. No.: 900,579

[22] Filed: Jun. 18, 1992

[51] Int. Cl.⁵ .............................................. F28D 21/00
[52] U.S. Cl. .................................. 250/505.1; 165/10; 250/504 R
[58] Field of Search ............. 250/505.1, 493.1, 504 R; 165/10, 104.11, 104.13, 41, 45, 81, 82, 162, 163, 185

[56] References Cited

U.S. PATENT DOCUMENTS

| | | | |
|---|---|---|---|
| 3,174,537 | 3/1965 | Meyer | 250/505.1 |
| 4,003,426 | 1/1977 | Best et al. | 165/10 A |
| 4,250,958 | 2/1981 | Wasserman | 165/10 A |

Primary Examiner—Paul M. Dzierzynski
Assistant Examiner—Kiet T. Nguyen
Attorney, Agent, or Firm—Iandiorio & Dingman

[57] ABSTRACT

A composite structure having predetermined temperature/time profiles is made by combining in chemically separate yet intimate thermal relation a plurality of phase change mediums which change phase at differing temperatures in the overall range of the predetermined temperature/time profiles. Each of the phase change mediums changes phase at a different temperature in sequence for defining the thermal storage capacity of the structure and generally approximating the predetermined temperature/time profiles throughout the overall temperature range.

21 Claims, 9 Drawing Sheets

COMPOSITE STRUCTURE HAVING PREDETERMINED TEMPERATURE/TIME PROFILES, AND METHOD OF MAKING SAME

FIELD OF INVENTION

This invention relates to a composite structure having predetermined temperature/time profiles, and a method for making it, and more particularly to such a composite structure which uses a number of phase change mediums to construct the desired profiles.

BACKGROUND OF INVENTION

Infrared optical masking or discrimination is a technique used by a defender to distinguish reentry vehicles from decoys by detecting the infrared signature of an object and comparing it to the temperature/time profiles of a known reentry vehicle. Presently, decoys are made by matching their temperature/time profiles using heaters or pyrotechnic techniques under cooling environments. This requires power supplies, wiring and some type of transducer which increase the size, weight and complexity of the decoy and generally encumber its design. Under heating environments, means for cooling are required, which are even more cumbersome, especially for integration into the skin of an aerospace vehicle. Extremes of cold and heat must be accounted for in exo-atmospheric applications where the objects pass from light to dark through the sun's terminator and alternately face deep space or the sun's rays. These environments establish the overall temperature range limits over which matching is desired. The matching must occur for any combinations and values of heating and cooling that can occur.

The defender is assumed to have multi-color infrared detection capability. Because of this, it is necessary for the decoy to match the reentry vehicle in size, shape and actual surface temperature profiles. The decoy top surface must match the reentry vehicle in detailed surface radiative properties (in all directions from surface normals, and over all wavelengths from far infrared to solar). A special thin top sheet of the decoy matches these radiative characteristics. These considerations require that the passive decoy, in matching the reentry vehicle, experience the same heating or cooling fluxes, and therefore must have the same overall heat capacity. In order to use a light-weight decoy the fundamental objective then must be to use a decoy structure having an effective specific heat much larger than that of the reentry vehicle.

SUMMARY OF INVENTION

It is therefore an object of this invention to provide a composite structure having temperature/time responses that can be tailored to match predetermined profiles.

It is a further object of this invention to provide such a composite structure which is totally passive, requiring no power source, wiring, controls, or the like.

It is a further object of this invention to provide such a composite structure which is lightweight, simple, requires no heating or cooling equipment, and is inexpensive and reliable.

It is a further object of this invention to provide such a composite structure which is moldable to any desired shape and is easily fabricated.

It is a further object of this invention to provide such a composite structure having an effective specific heat much larger than that of the reentry vehicle or other object to be imitated.

It is also a primary object of this invention to provide a method of fabricating a composite structure with predetermined temperature/time profiles.

The invention results from the realization that an effective light-weight passive structure with desired predetermined temperature/time profiles can be achieved by combining together in chemically distinct but intimate thermally coupled relation a plurality of phase change mediums which change phase at different temperatures in sequence for defining the thermal storage capacity of the structure and generally approximating the predetermined temperature/time profiles.

This invention features a composite structure having predetermined temperature/time profiles. There is a plurality of phase change mediums which change phase at differing temperatures in the overall range of the predetermined temperature/time profiles. There are means for combining the phase change mediums in chemically distinct and intimate thermally coupled relation. Each of the phase change mediums changes phase at a different temperature in the sequence for defining the thermal storage capacity of the structure and generally approximating the predetermined temperature/time profiles throughout the overall temperature range.

In a preferred embodiment the phase change mediums may be homogeneously mixed. The means for combining may include microencapsulation means. The phase change mediums each may contain at least one phase change material. The phase change mediums may be heterogeneously grouped in a plurality of discrete sites and the means for combining may include a thermal shunt connected between the mediums at each site. The composite structure may also include a thermal conductor path parallel to the thermal path through the phase change mediums for controlling the thermal resistance of the structure. The thermal conductor path may include discrete conductor means extending at least part way through the structure in contact with the phase change mediums. The thermal conductor path may include a thermal conductive coating on the microencapsulation beads, or it may include an expanded metal matrix. The means for combining may include a housing having a corresponding plurality of compartments for defining the sites.

The invention also features a composite structure having predetermined temperature/time profiles. There are a plurality of phase change mediums which change phase at differing temperatures in the overall range of the predetermined temperature/time profiles. There are means for combining the phase change mediums in chemically distinct and intimately thermally coupled relation. Each of the phase change mediums change phase at a different temperature in sequence for defining the thermal storage capacity of the structure and generally approximating the predetermined temperature/time profiles throughout the overall temperature range. A thermal conductor path extends parallel to the thermal path through the change phase mediums for controlling the thermal resistance of the structure.

The invention also features a composite structure having predetermined temperature/time profiles. There is a plurality of phase change mediums which change phase at differing temperatures in the overall range of the predetermined temperature/time profiles. Each of the phase change mediums changes phase at a different temperature in sequence for defining the thermal storage capacity of the structure and generally approximating the predetermined temperature/time profiles throughout the overall temperature range. There are microencapsulation means for encapsulating the mediums in chemically distinct, intimate thermally coupled capsules and there is a thermal conductor matrix for establishing a thermal path extending parallel to the thermal path through the phase change mediums for controlling the thermal resistance of the structure.

In a preferred embodiment, the thermal conductor matrix may be metal. It may be a coating on the microencapsulation capsules, or it may be a separate expanded metal member. The structure may further include a thermal medium for uniformly distributing heat over the surface of the structure and that thermal medium may be a metal foil. There may also be a heat transfer medium applied to the surface for controlling emissivity and absorption of heat by the phase change mediums.

The invention also features a composite structure having predetermined temperature/time profiles. There are a plurality of phase change mediums which change phase at a temperature in the overall range of the predetermined temperature/time profiles. There are means for combining the phase change mediums in chemically distinct and intimately thermally coupled relation. Each of the phase change mediums change phase at a different temperature in sequence for defining the thermal storage capacity of the structure and generally approximating the predetermined temperature/time profiles throughout the overall temperature range. A thermal conductor path extends parallel to the thermal path for the phase change mediums for controlling the thermal resistance of the structure. There are bonding means for bonding together the microencapsulated capsules of phase change mediums.

The invention also features a method of making a composite structure having predetermined temperature/time profiles. The steps include combining a plurality of phase change mediums which change phase at differing temperatures in the overall range of the predetermined temperature/time profiles in chemically distinct and intimate thermally coupled relation. Each of the phase change mediums changes phase at a different temperature in sequence for defining the thermal storage capacity of the structure and generally approximating the predetermined temperature/time profiles throughout the overall temperature range. The method also includes installing in the combined phase change mediums a thermally conductive matrix for establishing a thermally conductive path parallel to the thermal conductive path through the phase change mediums for controlling the thermal resistance of the structure. The phase change mediums are bonded together with a matrix to form a unitary structure.

In a preferred embodiment the steps of combining include microencapsulating each of the phase change mediums and homogeneously mixing the microencapsulation capsules.

BRIEF DESCRIPTION OF THE DRAWINGS

Other objects, features and advantages will occur to those skilled in the art from the following description of a preferred embodiment and the accompanying drawings, in which.

DISCLOSURE OF PREFERRED EMBODIMENT

This invention employs the use of phase change mediums to obtain predetermined temperature/time profiles. Phase change mediums exhibit a step change in temperature slope as heat is added or removed from the medium, while common materials exhibit a fairly linear temperature/time profile. Phase change mediums, which may include one or more phase change materials, refer to those mediums which exhibit a very large heat capacity per unit mass in the solid to liquid phase transition. This high heat capacity enables construction of a lightweight body which has the same thermal response as a much heavier solid body. Thus materials are selected having melting and freezing temperatures over the entire temperature range of predetermined temperature/time profiles, so that a structure can be fabricated which duplicates any predetermined temperature/time profile of a solid body and which is much lighter and less expensive than the actual object to be imitated. The temperature/time response or profile of a substance can be achieved by a stepwise approximation of the desired profile with a series of phase change materials each of which is triggered at a different narrow temperature range determined by its melting or solidification process. The different phase change mediums cannot simply be mixed together because such a mixture would not give the sum of the properties of the individual materials. The mediums must be kept chemically separate to deliver the proper thermal capacity (C) which renders the desired temperature/time profiles. If the materials then give a desired profile shape, but provide that profile offset from the desired surface temperatures, then the thermal resistance (R) can also be tailored using suitable alternative thermal paths or shunts, to minimize the offset.

The composite structure may include a thermal conductor path parallel to the thermal path into the phase change mediums for controlling the thermal resistance of the structure as well as its thermal capacitance. This can be done by using discrete conductors extending at least part way through the structure in contact with the phase change mediums. The discrete conductors may include an expandable metal matrix which expansion is adjusted to provide the necessary weight per unit area to establish the thermal conductance of the second path in parallel with the paths into the phase change mediums so that the overall thermal resistance is at a desired level to produce the proper offset to the temperature/time profiles. This path may also be achieved by providing a thermally conductive coating on the microencapsulation beads themselves.

Increased spatial uniformity of surface temperature may be achieved by using a conductive medium on the surface of the structure, such as aluminum foil, which acts as a shunt to distribute the heat over the surface to the expanded metal matrix.

If the thermal resistance and thermal capacitance of the structure established by the phase change medium matches the bulk thermal properties of the object to be mimicked, such as a reentry vehicle, and a skin is applied, on top of the foil for example, which matches the absorptivity $\alpha$ and emissivity s of the surface to be mimicked, the temperature-time profiles on the surface of the phase change structure will be identical to the object to be mimicked.

The composite structure need not include a homogeneous mix of phase change mediums. For example, the structure may provide for a heterogeneous grouping of a plurality of phase change mediums at a multiplicity of discrete sites. For example, a housing with a multiplicity of recesses may be provided with a different phase change medium housed in each recess. A thermal shunt is then connected between the mediums at each site in order to provide the necessary intimate thermal contact while preserving the chemical independence so that as a group the phase change mediums provide the proper temperature/time profiles. Alternatively, the phase change mediums may be layered one on top of the other, by use of conductive lateral separators and more widely spaced depth shunts.

The composite structure of this invention reproduces the temperature/time profiles in both hot and cold environments because it has thermal capacitance and thermal resistance that may each be separately tuned or adjusted. By varying the thermal capacitance one can vary the overall shape or temperature/time profile through the adjustment range of the ratios of the phase change mediums. One can vary the thermal resistance and thus the offset or position of the profile by varying the density or spacings of the conductive matrix; for example, the density of the expanded metal matrix in relation to that of the phase change mediums.

Figure 1:
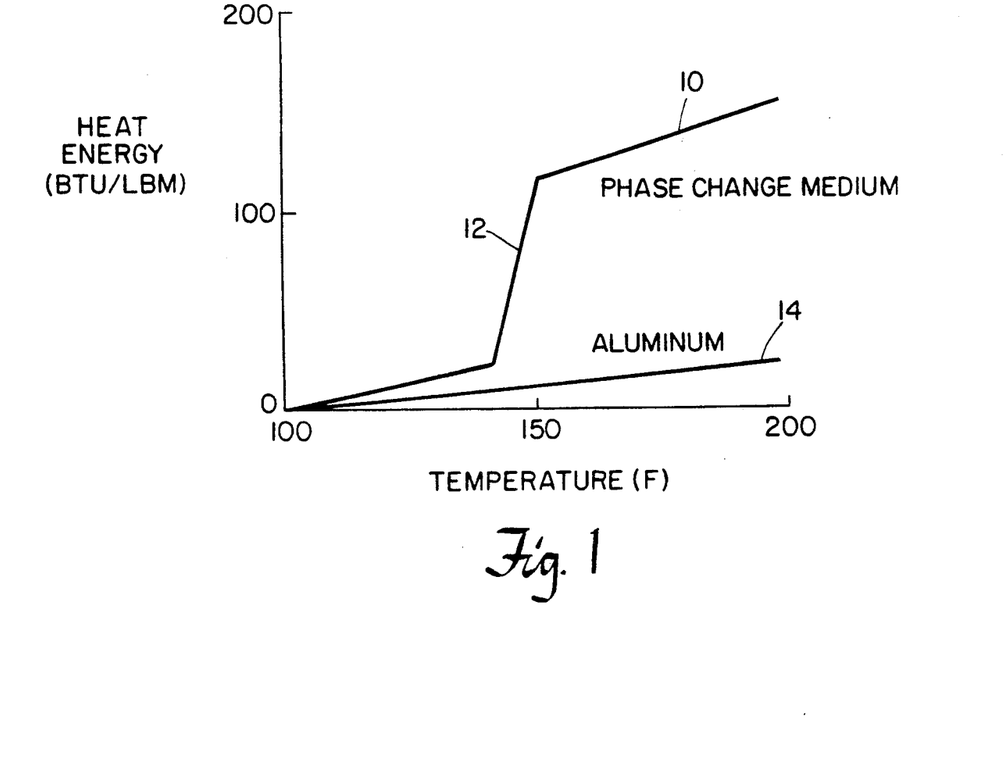
FIG. 1 is a graph depicting the dramatic difference in the heat absorption of a phase change material compared to a more typical element such as aluminum.

There is shown in FIG. 1 a graph showing the variation in heat energy with respect to temperature of a phase change medium such as the normal paraffin n-octacosane ($C_{28}H_{58}$) whose characteristic is indicated at 10 and has a sharp increase 12 of heat energy over a fairly narrow temperature range of 140–150° F. In contrast, a more conventional material such as aluminum has a straight linear characteristic 14 with no such abrupt, dramatic heat storage effect in the observed temperature range.

Figure 2:
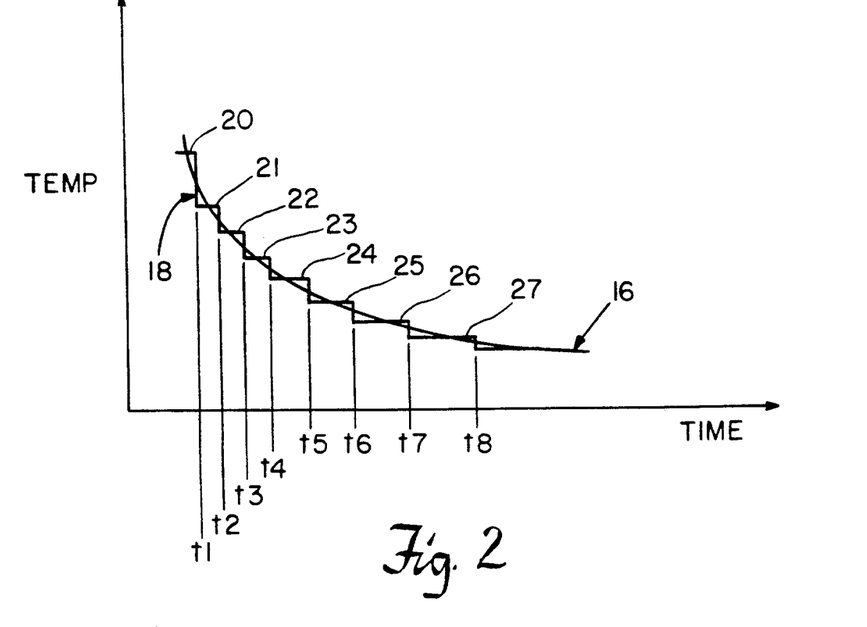
FIG. 2 is a temperature versus time plot of a composite structure according to this invention showing the use of a number of phase change materials to achieve a stepwise approximation of a predetermined temperature/time profile.

The stepwise approximation 18 of a reentry vehicle temperature profile 16, FIG. 2, can be approximated with the composite structure of this invention by employing a plurality of phase change mediums whose phase changes occur at a series of temperatures over time. Thus the stepped approximation characteristic 18 exhibits the phase change of the first phase change material at point 20, time $t_1$; of the second phase change material at point 21, time $t_2$; of the third phase change material at point 22, time $t_3$, and similarly for points 23–27 at times $t_4$–$t_8$. Such infrared signature mimicking is useful not only with respect to reentry vehicles, but also has potential application for houses, armored vehicles such as tanks and armored personnel carriers, and wherever else such profile imitation may be desired.

Figures 3, 4:
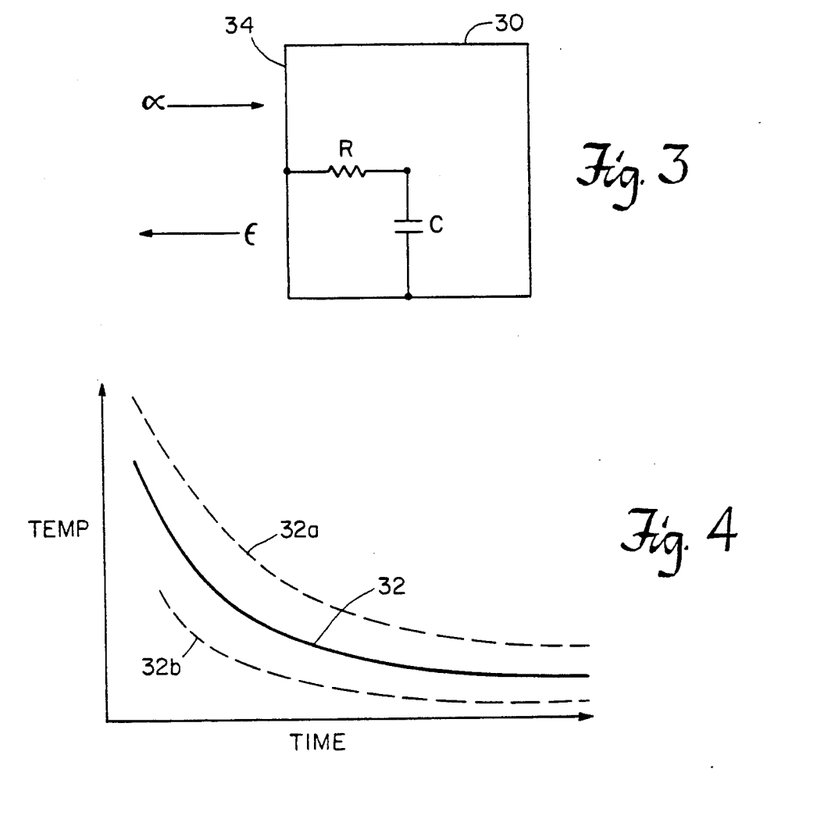
FIG. 3 is a simplified equivalent circuit analog showing the effective thermal resistance between the top surface and the total thermal capacitance of a composite structure according to this invention.
FIG. 4 is a graphic illustration of a temperature/time profile with and without offsetting due to thermal resistance.

There are a number of parameters that affect the infrared signature and temperature/time profile of an object. For example, an object 30, FIG. 3, is represented as having a particular thermal storage capacity C and effective thermal resistance R. The thermal storage capacity C determines the overall shape of the temperature/time profile 32, FIG. 4. The offset of temperature/time profile 32, that is, whether it occupies the position 32a, 32b, or some parallel position, depends upon the thermal resistance R. The goal is to match the surface temperature response of a decoy made from the composite structure to that of a reentry vehicle or some other known object to be imitated. Inside the composite structure the temperature response is characterized by R, the thermal resistance, and C, the thermal capacitance. R controls the surface temperature offset; C controls the overall time rate of temperature change in the bulk structure. At the surface, the absorptivity $\alpha$ represents the portion of solar heat that is absorbed, while emissivity $\epsilon$ indicates the heat radiated to the environment. If the thermal capacitance C of the decoy or the composite structure and some object are matched, then the temperature/time profiles will be matched, but there may still be an offset, as indicated in FIG. 4. To obtain that equality as well, the thermal resistance R must also be matched. For example, for a reentry vehicle in the exoatmosphere, the heat Q received by the body is equal to the solar heat, Q times the absorptivity $\alpha$. The Q radiated by the body is proportional to the emissivity $\epsilon$ times the difference between the temperature of the sink, that is outer space, to the fourth power, minus the temperature of the reentry vehicle to the fourth power. The thermal resistance R is determined by the thickness and effective conductivity of the phase change material and conductors. In one construction the overall conductance is a combination of the conductances (R) of the phase change mediums or materials and a thermal shunt such as an expanded metal aluminum matrix. The tuned resistance represented by the parallel combination of the aluminum matrix and the phase change medium distributes the heat load through the phase change medium so that the heat can be distributed uniformly throughout the phase change medium in order to exploit the stepped approximation mechanism and so that the desired offset temperature is achieved.

Figure 5:
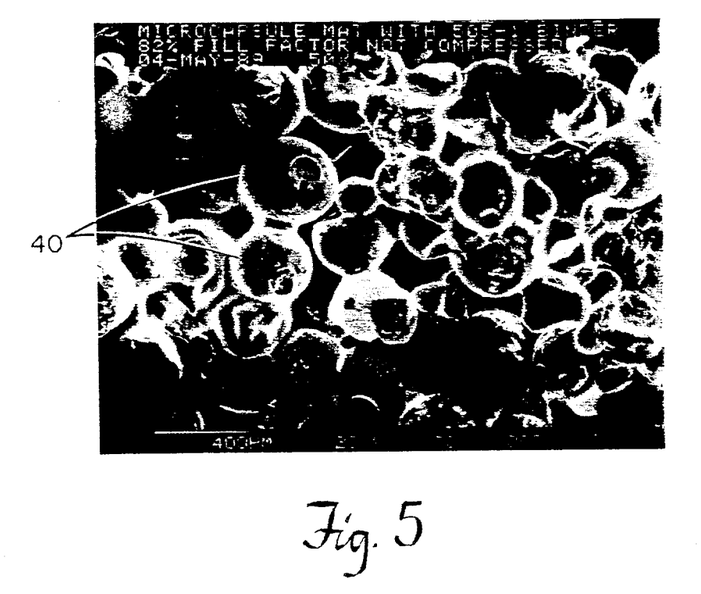
FIG. 5 is an enlarged detail view of a portion of a composite structure according to this invention made by microencapsulating the phase change mediums.

The phase change mediums may be microencapsulated as small beads 40, such as shown in FIG. 5, where the beads have a diameter of 200-500 microns. The beads of the various phase change mediums are homogeneously mixed together in the desired proportions to obtain the required thermal capacity profile. They may then be mixed together with a proper bonding agent to form a slurry 42, FIG. 6, which fills the recesses or cells 42 of the aluminum expanded metal matrix 44 to form a composite structure 46 which is approximately 3 inches wide, 6 inches long, and 0.5 inch thick. The amount of aluminum compared to the amount of phase change mediums used in the structure 46 tunes the resistance R to match the surface temperature profile of 46 to closely match the thermal characteristics of the profile to be imitated.

Figure 6:
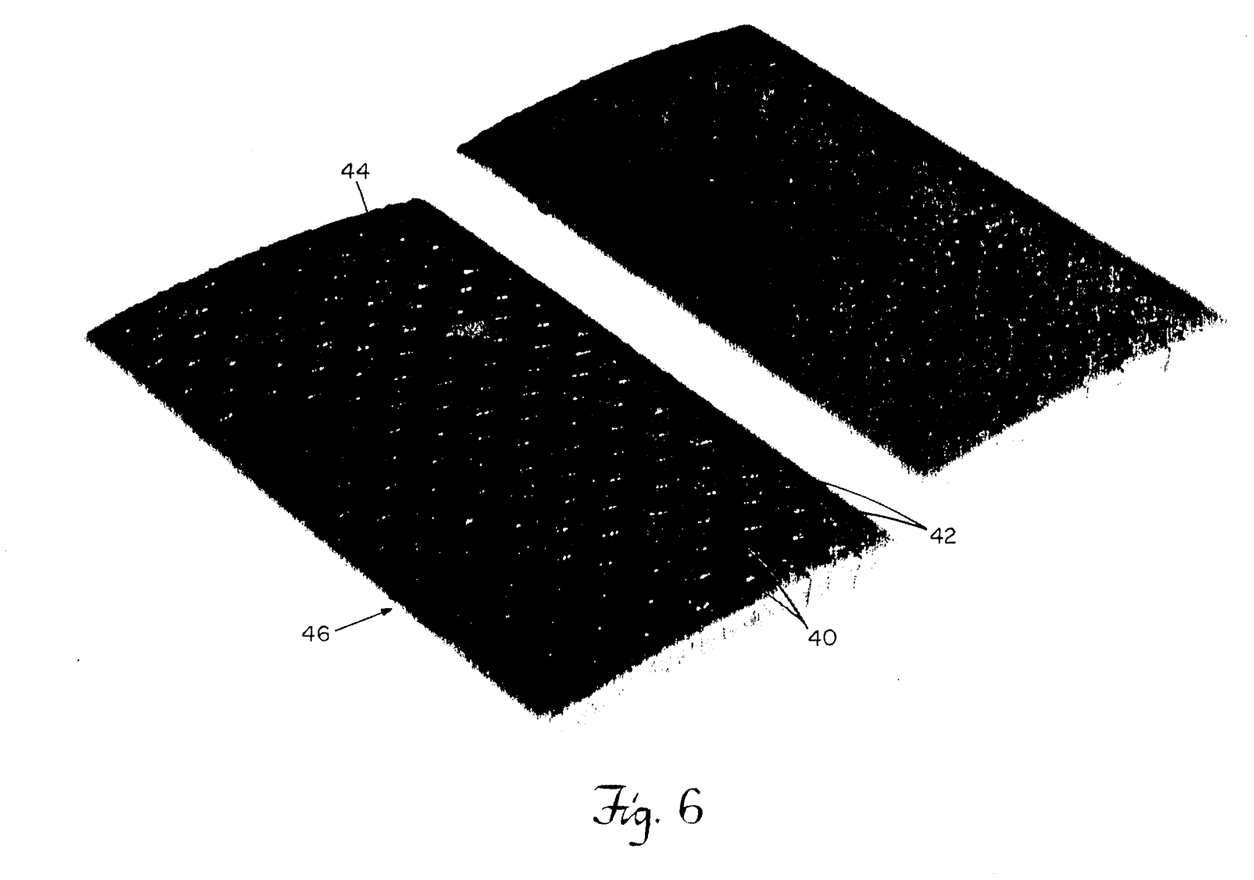
FIG. 6 is a three-dimensional view of a composite structure employing homogeneously mixed microcapsules or beads of FIG. 5 with an expanded metal matrix embedded in it.
Figure 7:
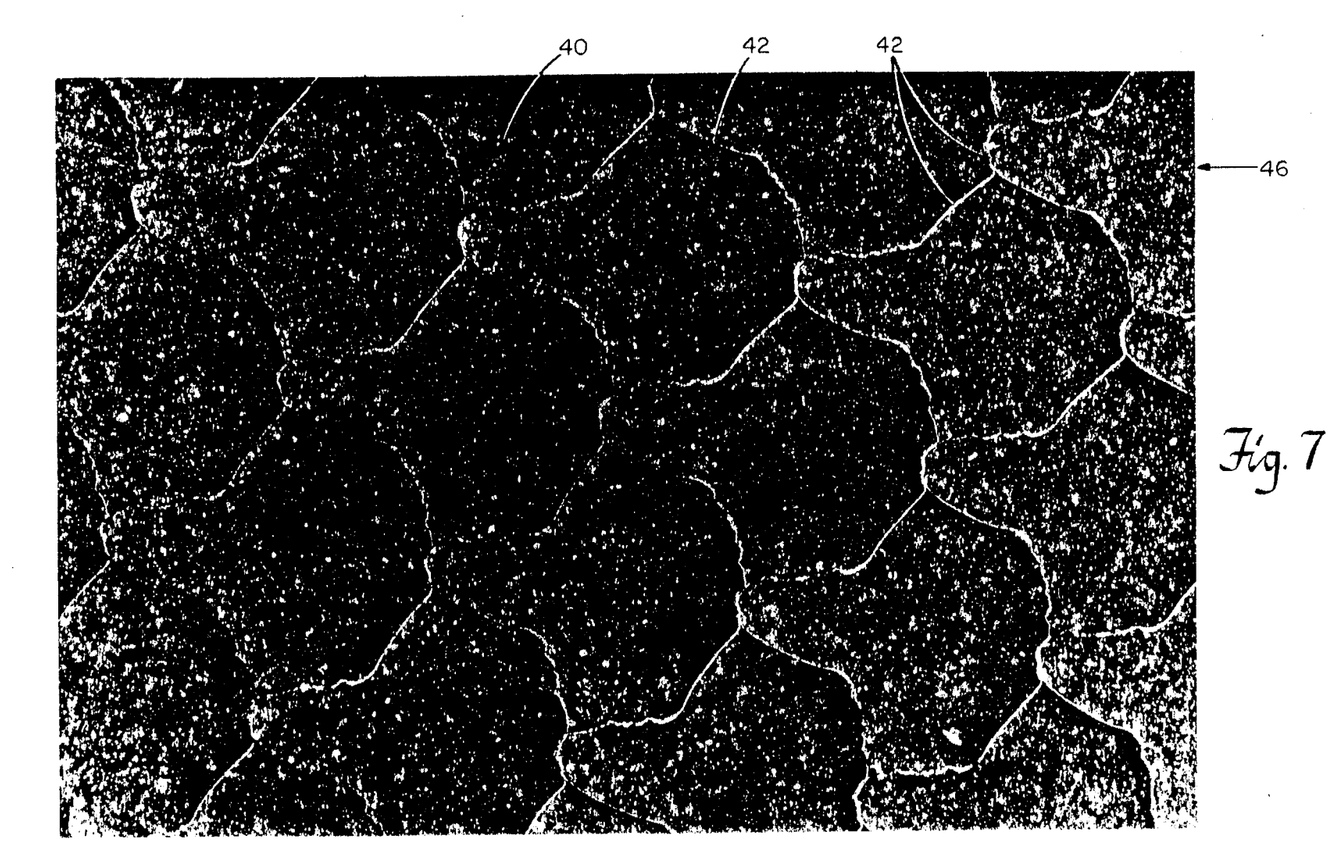
FIG. 7 is a greatly enlarged plan view of a portion of the surface of the structure of FIG. 6.

A portion of composite structure 46 is shown greatly enlarged in FIG. 7, where cells 42 can be seen to comprise a multiplicity of beads 40 of the different phase change mediums homogeneously mixed in order to provide the desired profile. If the thermal resistance and thermal capacitance of structure 46 in FIG. 6 is insufficient to closely approximate the desired profile, additional steps can be taken. For example, a thermal surface shunt such as 4-6 mils aluminum foil 50, FIG. 8, can be laid across the top surface 52 of structure 44 to ensure a fast and uniform distribution of heat and a skin 54 of Kapton membrane obtained from Sheldahl Corp. of Northfield, Minnesota, can be used to provide the proper emissivity $\epsilon$ and solar absorptivity $\alpha$.

Figure 8:
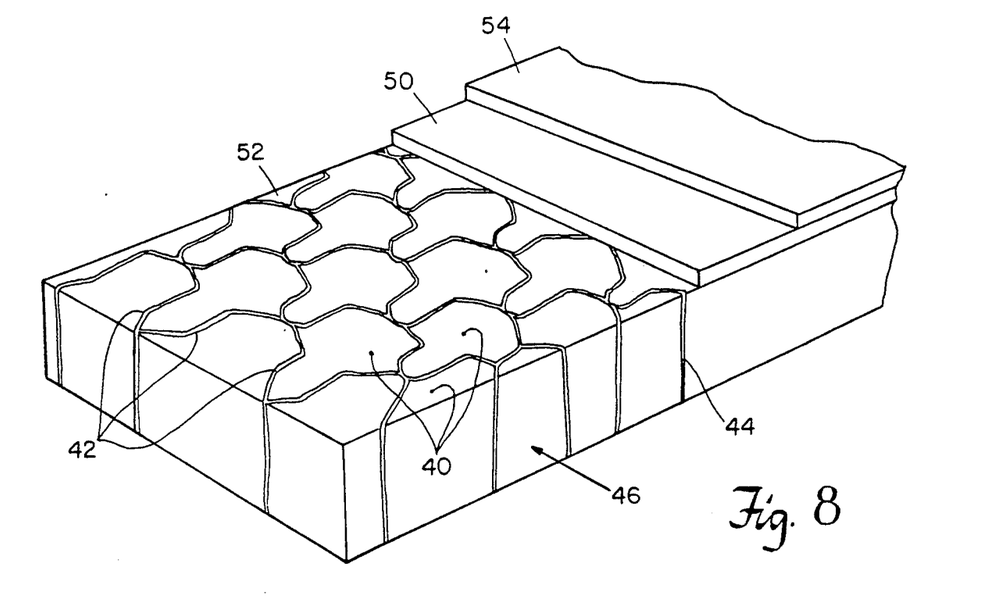
FIG. 8 is a three-dimensional view of a portion of a structure similar to that shown in FIGS. 6 and 7 containing on one of its surfaces a conductive layer and an absorption/emission control layer.
Figure 9:
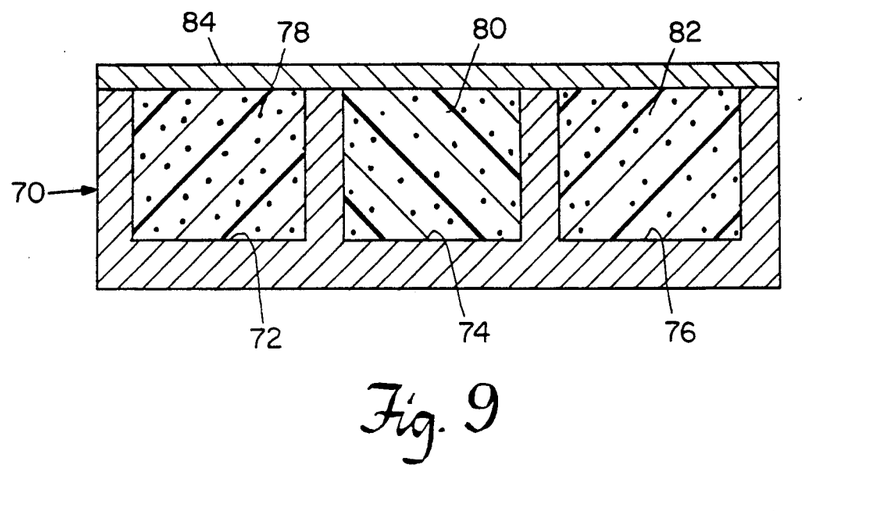
FIG. 9 is a side sectional elevational view of an alternative construction of a composite structure according to this invention in which the phase change mediums are not homogeneously mixed.
Figure 10:
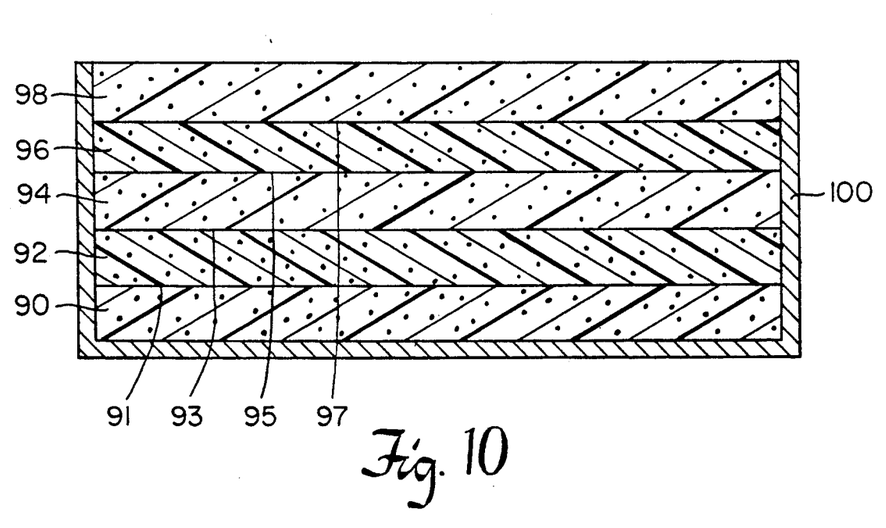
FIG. 10 is a side elevational sectional view of another embodiment of a composite structure with the phase change mediums separated according to this invention.

Although in the embodiment shown in FIGS. 6, 7 and 8 the phase change mediums are microencapsulated, homogeneously mixed and provided in a heat-conductive matrix, this is not a necessary limitation of the invention. That is, microencapsulating and homogeneously mixing the phase change mediums is not the only means for combining them in a chemically distinct yet intimately thermally coupled relation. For example, as shown in FIG. 9, a housing 70 having a number of sites or chambers 72, 74 and 76 may be used to contain three different phase change mediums 78, 80 and 82, which are kept chemically distinct even without microencapsulation by the separation afforded by chambers 72, 74 and 76. The intimate thermal coupling is accomplished by shunt 84 such as a metal foil or plate, which uniformly distributes heat across all three sites. The separation afforded by microencapsulation or by chambers 72, 74 and 76 is not strictly necessary: a number of different phase change mediums may be fabricated in distinct layers 90, 92, 94, 96 and 98, FIG. 10, one on top of the other separated by lateral conduction sheets 91, 93, 95 and 97, all within a suitable housing 100 to provide chemical distinctness and intimate thermal coupling.

Composite structure 46, FIG. 5, is made using six different phase change mediums, each of which contains more than one phase change material as follows:

Tetradecane/Heptadecane, Pentadecane/Octadecane Hexadecane/Nonadecane, Heptadecane/Nonadecane Octadecane/Docosane, Nonadecane/Docosane Their phase change temperatures are 32.6° F., 43.5° F., 51.9° F., 69.6° F., 81.1° F., 91.2° F., respectively. Each of the phase change mediums were microencapsulated in capsules of diameter 200-500 microns The capsules of the six different phase change mediums are homogeneously mixed together in the following proportions: 22%, 17%, 12%, 17%, 17% and 17%, respectively. They are then mixed together with a bonding agent such as Bacon Industries, Inc. DER332 to form a slurry. A piece of unexpanded flexible aluminum honeycomb core (0.0015 inch thick) is expanded to a nominal cell spacing of 40 cells per linear foot so that its expanded mass density is 1.5 pounds per cubic foot. The slurry formed from the homogeneous mixture of microencapsulated beads and bonding agent was then troweled into the expanded metal matrix to form a composite structure roughly 6 inches long, 3 inches wide and 0.35 inch thick. Curing is accomplished at a temperature sufficiently low so as not to destroy the microencapsulation beads e.g., 100° F.

The composite structure according to this invention can be made to conform to complex curved surfaces. For example, the flexible honeycomb formed from the expanded metal can be wrapped around radii as small as that of a baseball.

Figure 11:
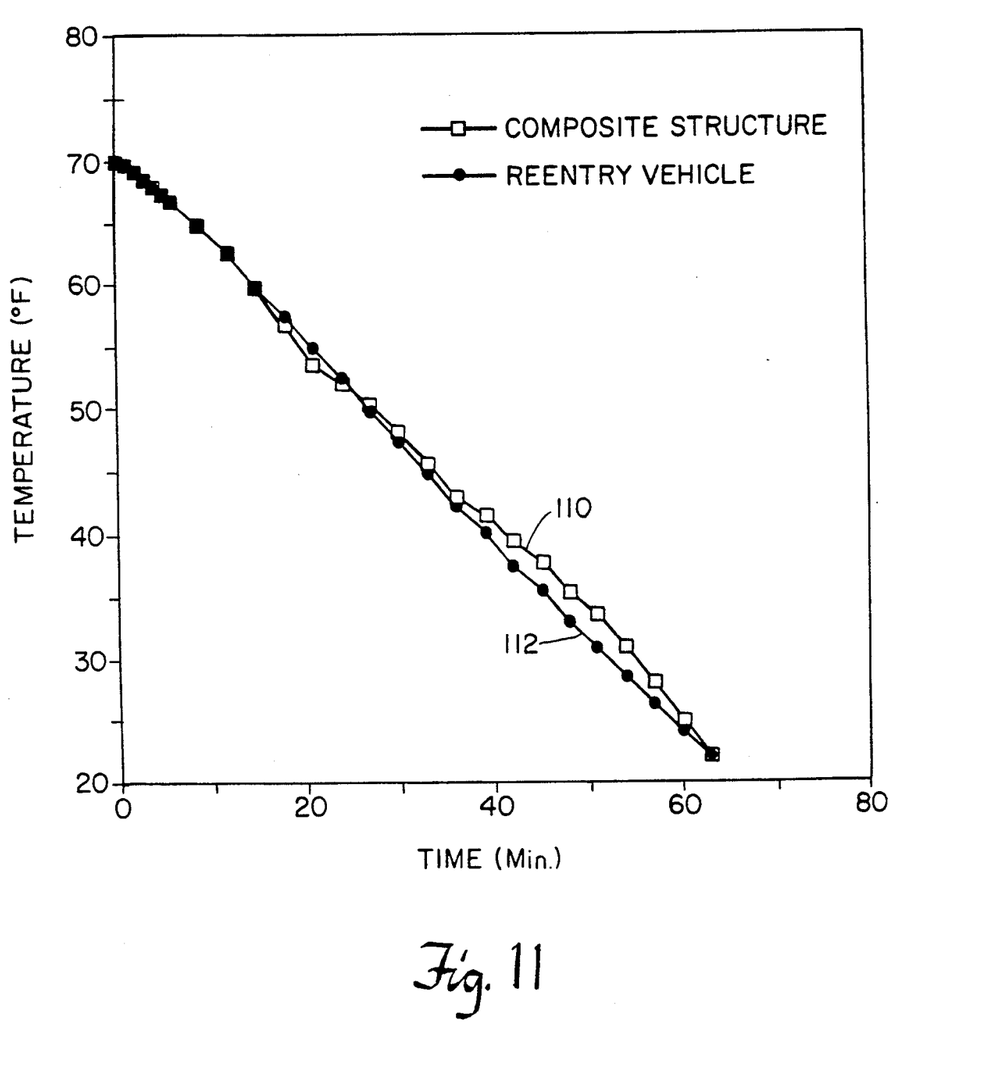
FIG. 11 is a graphic depiction of a temperature/time profile of a test coupon of a composite structure according to this invention and a test coupon from a reentry vehicle aeroshell during exposure to a cooling environment.
Figure 12:
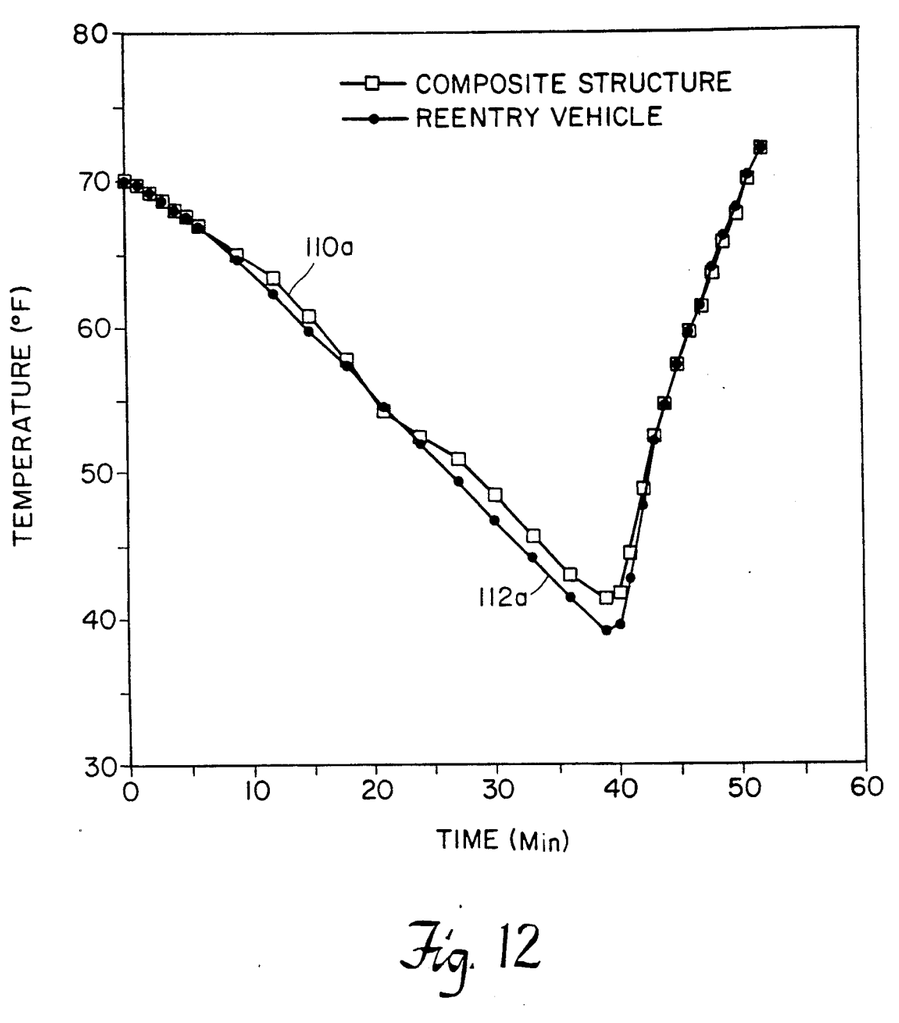
FIG. 12 is a graphic depiction of a temperature/time profile of a test coupon of a composite structure according to this invention and of a test coupon from a reentry vehicle aeroshell during a cooling environment followed by a heating environment.

This composite structure was tested by being submitted side by side to the same surface heat loading variation as was a test section representative of the reentry vehicle aeroshell supplied by the U.S. Air Force. A very close approximation of the temperature/time profiles of the two devices resulted as shown in FIG. 11, where the composite structure profile 110 closely follows that of the test coupon from the reentry vehicle 112, an RV aeroshell, as the temperature decreases from 70° F. to 20° F. over a period of a little more than an hour. In another test where the temperature decreased and then suddenly increased, the two profiles 110a, 112a, still were close and exhibited excellent short-term response, as shown in FIG. 12.

Figure 13:
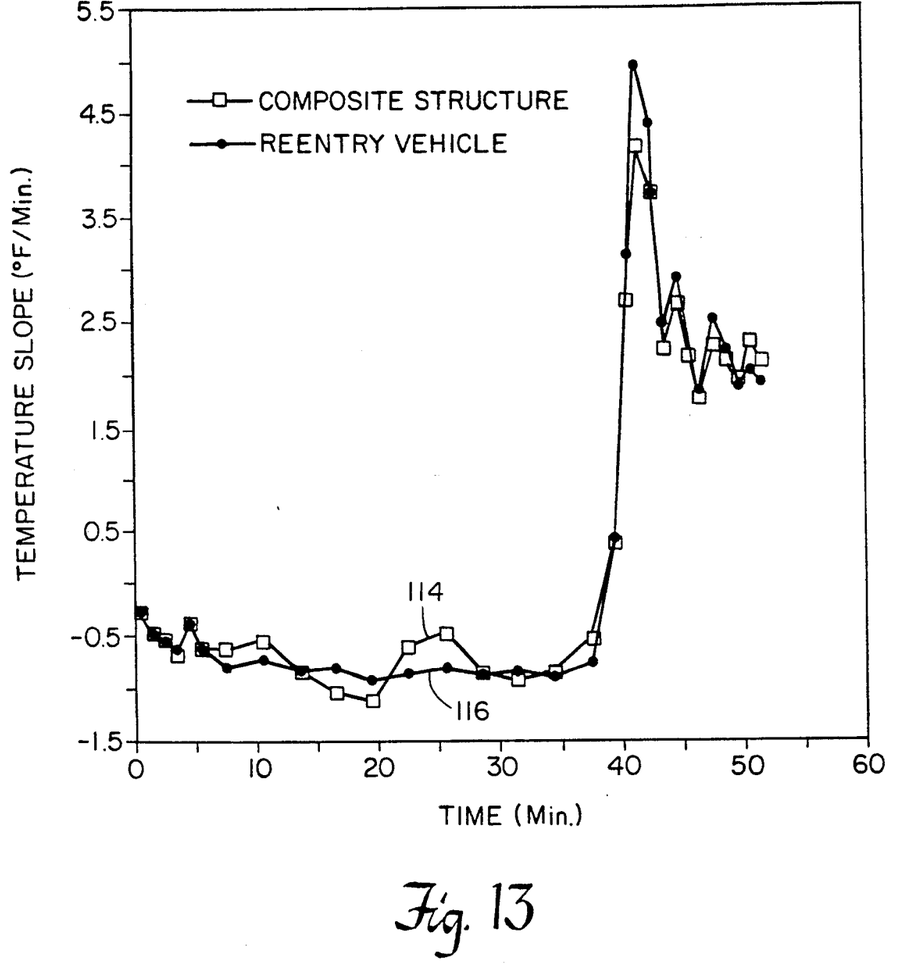
FIG. 13 is a graphic depiction of the slope or first derivative of the temperature with respect to time for a composite structure according to this invention and a reentry vehicle aeroshell, for the same environmental conditions of FIG. 12.

Even in second order characteristics such as the first derivative or the slope of the temperature with respect to time, the profiles of the two bodies closely tracked one another. In FIG. 13 the change in the slope 114 of the temperature of the composite structure 46 very closely tracked the slope 116 of the coupon from a reentry vehicle whose temperature/time profile was to be matched.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A composite structure having predetermined temperature/time profiles comprising:

a plurality of phase change mediums which change phase at differing temperatures in the overall range of the predetermined temperature/time profiles;

means for combining said phase change mediums in chemically distinct and intimately thermally coupled relation;

each of said phase change mediums changing phase at a different temperature in a sequence for defining the thermal storage capacity of the structure and generally approximating the predetermined temperature/time profiles throughout the overall temperature range.

2. The composite structure of claim 1 in which said phase change mediums are homogeneously mixed and chemically distinct.

3. The composite structure of claim 2 in which said means for combining includes microencapsulation means.

4. The composite structure of claim 2 in which said structure includes a thermal conductor path, parallel to the thermal path through said phase change mediums, for controlling the thermal resistance of said structure.

5. The composite structure of claim 4 in which said thermal conductor path includes discrete conductor means extending at least part way through said structure in contact with said phase change mediums.

6. The composite structure of claim 7 in which said thermal conductor includes a thermal conductive coating on said microencapsulation beads.

7. The composite structure of claim 5 in which said conductor means includes an expanded metal matrix.

8. The composite structure of claim 1 in which said phase change mediums each contain at least one phase change material.

9. The composite structure of claim 1 in which said phase change mediums are heterogeneously grouped in a plurality of discrete sites and said means for combining includes a thermal shunt connected between said mediums at each site.

10. The composite structure of claim 9 in which said means for combining includes a housing having a corresponding plurality of compartments for defining said sites.

11. A composite structure having predetermined temperature/time profiles comprising:
a plurality of phase change mediums which change phase at differing temperatures in the overall range of the predetermined temperature/time profiles;
means for combining said phase change mediums in chemically distinct and intimately thermally coupled relation;
each of said phase change mediums changing phase at a different temperature in a sequence for defining the thermal storage capacity of the structure and generally approximating the predetermined temperature/time profiles throughout the overall temperature range; and
said structure including a thermal conductor path, parallel to the thermal path through said phase change mediums, for controlling the thermal resistance of said structure.

12. A composite structure having predetermined temperature/time profiles comprising:
a plurality of phase change mediums which change phase at differing temperatures in the overall range of the predetermined temperature/time profiles;
each of said phase change mediums changing phase at a different temperature in a sequence for defining the thermal storage capacity of the structure and generally approximating the predetermined temperature/time profiles throughout the overall temperature range;
microencapsulation means for encapsulating said mediums in chemically distinct, intimately thermally coupled capsules; and
a thermal conductor matrix for establishing a thermal path extending parallel to the thermal path through said phase change mediums for controlling the thermal resistance of said structure.

13. The composite structure of claim 12 in which said thermal conductor matrix is metal.

14. The composite structure of claim 12 in which said thermal conductor matrix is a thermal conductive coating on said microencapsulation capsules.

15. The composite structure of claim 12 in which said thermal conductor matrix is an expanded metal member.

16. The composite structure of claim 12 further including a thermal medium for uniformly distributing heat over the surface of said structure.

17. The composite structure of claim 16 in which said thermal medium includes metal foil.

18. The composite structure of claim 16 further including a heat transfer medium for controlling emissivity and absorption of heat by said phase change mediums.

19. A composite structure having predetermined temperature/time profiles comprising:
a plurality of phase change mediums which change phase at differing temperatures in the overall range of the predetermined temperature/time profiles;
each of said phase change mediums changing phase at a different temperature in a sequence for defining the thermal storage capacity of the structure and generally approximating the predetermined temperature/time profiles throughout the overall temperature range;
microencapsulation means for encapsulating said mediums in chemically distinct, intimately thermally coupled capsules;
a thermal conductor matrix for establishing a thermal path extending parallel to the thermal path through said phase change mediums for controlling the thermal resistance of said structure; and
bonding means for bonding together said microencapsulated capsules of phase change mediums.

20. A method of making a composite structure having predetermined temperature/time profiles comprising:
combining a plurality of phase change mediums, which change phase at differing temperatures in the overall range of the predetermined temperature/time profiles, in chemically distinct and intimately thermally coupled relation; each of said phase change mediums changing phase at a different temperature in a sequence for defining the thermal storage capacity of the structure and generally approximating the predetermined temperature/time profiles throughout the overall temperature range;
installing in said combined phase change mediums a thermally conductive matrix for establishing a thermal conductor path parallel to the thermal path through the phase change mediums for controlling the thermal resistance of the structure; and
bonding said phase change mediums and matrix to form a unitary structure.

21. The method of making a composite structure according to claim 20 in which the step of combining includes microencapsulating each of said phase change mediums and homogeneously mixing the microencapsulation capsules.

* * * * *